United States Patent Office 3,345,175
Patented Oct. 3, 1967

3,345,175
HIGH EDGE-GRADIENT PHOTOSENSITIVE MATERIAL
Yoshihide Hayakawa, Minamiashigara-machi, Ashigarakami-gun, Kanagawa-ken, Japan, assignor to Fuji Shashin Film Kabushiki Kaisha, Ashigarakami-gun, Kanagawa-ken, Japan, a corporation of Japan
No Drawing. Filed May 15, 1964, Ser. No. 367,892
Claims priority, application Japan, May 17, 1963, 38/24,400
4 Claims. (Cl. 96—76)

It is an object of this invention to provide photographic emulsions which can give the highly contrasted image when the developing solution of this type is used. Photosensitive materials prepared from such emulsions are suitable for producing halftone-dot by means of glass screen or contact screen.

It has been well known that by the addition of derivatives of alkylene oxide, such as the addition polymer of 1 mole of sorbitan monolaurate and 20 moles of ethylene oxide to the emulsion, the contrast of image can be improved (ref. U.S.P. No. 2,400,532). However, since the addition of alkylene oxide also results in the remarkable decrease in the rate of development, it is necessary to prolong the time of development in order to attain the sufficient contrast. Therefore, when the development is carried out for a relatively short time as is common in practice (for 2 to 3 minutes), the sensitivity is remarkably decreased and the halftone dots having sharp edges cannot be obtained. Accordingly, it is another object of this invention to produce the superior halftone dots with a relatively short time of development by increasing the contrast and the edge-gradient of the image.

The object of this invention is accomplished by incorporating in the emulsion layer and/or its adjacent layer of a photographic material both (A) a compound selected from the group consisting of those represented by the following general Formula 1:

$$\begin{matrix} R_1 \\ \phantom{R}\diagdown \\ \phantom{RR}N-A-X-CONHR_3 \\ \phantom{R}\diagup \\ R_2 \end{matrix} \quad (1)$$

(wherein $R_1$ and $R_2$ each represents an alkyl group, or may combine to form a ring, which may contain —O—, —S— or —NR— group (R represents alkyl or acyl group). $R_3$ represents alkyl or aryl group, and A represents alkylene group. X represents —NH— or —O— group) and their salts (e.g. hydrohalide, sulfate, etc.) and (B) a condensation product of alkyleneoxide with a compound selected from the group consisting of water, aliphatic alcohols, glycols, fatty acids, aliphatic amines, phenols and hexitol ring dehydration products.

Examples of the compounds represented by the general Formula 1 are as follows:

Compound 1

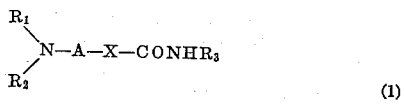

Compound 2

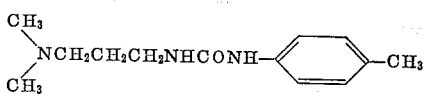

Compound 3

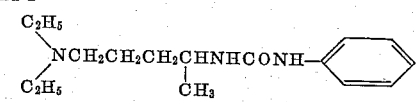

Compound 4

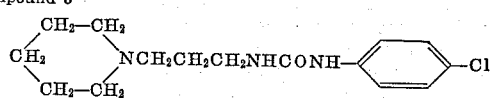

Compound 5

Compound 6

Compound 7

Compound 8

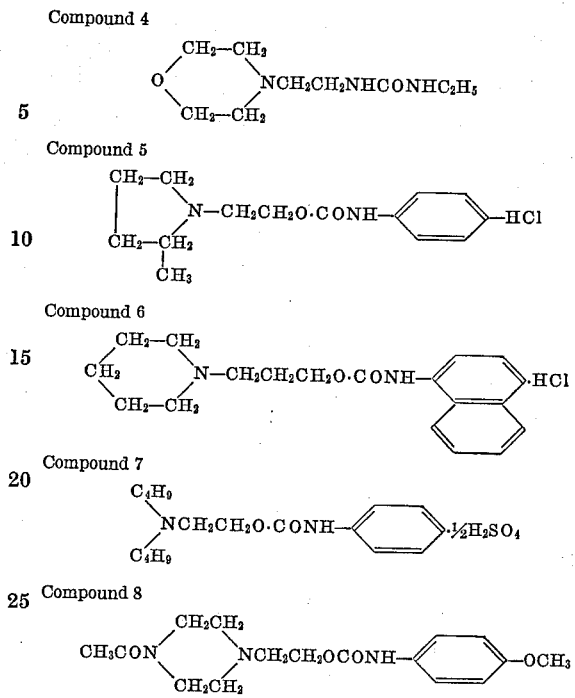

It will be seen that these compounds are characterized in that they carry more than two nitrogen atoms and that one of them is in a form of tertiary amine and the other forms urea- or urethane-type combination.

It is preferable for polyalkylene oxide derivatives used in this invention to have a molecular weight between 800 and 6,000. Examples of these compounds are given as follows:

$$HOCH_2CH_2O(CH_2CH_2O)_nCH_2CH_2OH$$

($n$=about 50)

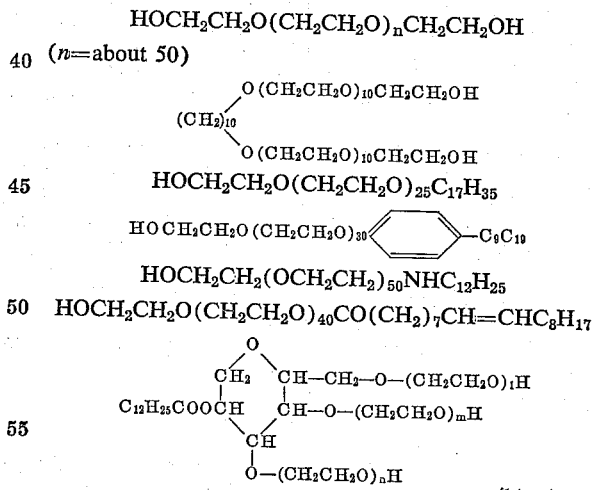

($1+m+n=20$)

In this invention, deviratives of 4-hydroxy-1,3,3a,7-tetrazaindene, which are useful for the same purpose as that of this invention, can be employed together with the polyalkylene oxide derivatives in this invention.

Derivatives of 4-hydroxy-1,3,3a,7-tetrazaindene useful in this invention are represented by the following general Formula II.

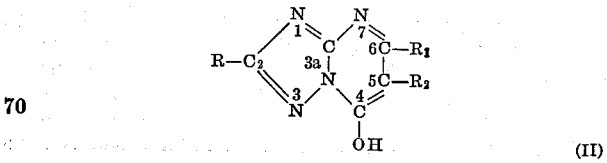

(II)

(wherein R and $R_1$ represent hydrogen atom, alkyl group, aralkyl group or aryl group and $R_2$ represents hydrogen atom, alkyl group, carboxy group or alkoxycarbonyl group).

These tetrazaindene compounds can generally be synthesized by heating one mole of β-ketoesters or α-ethoxymethylene-β-ketoesters with one mole of 3-amino-1,2,4-triazols.

These derivatives are illustrated by the following examples:

Compound 9

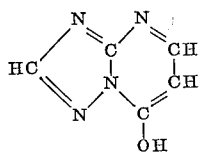

Compound 10

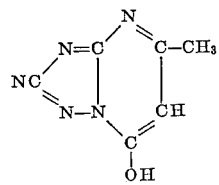

Compound 11

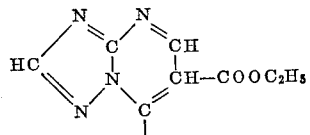

Compound 12

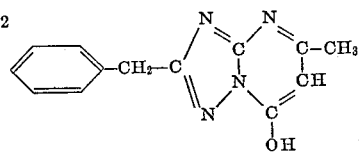

The most useful amount of compounds in this invention may be varied according to the sort of emulsion, however, it is preferable to add the compound in a proportion of 0.05 g. to 10 g. of those represented by the general Formula I and 0.01 g. to 1 g. of polyalkylene oxide derivatives per mole of silver halide in the emulsion.

Photographic emulsions are prepared in the following three stages: (1) The emulsification and digestion (first ripening) of the silver halide, (2) removal of excess of salts by washing with water and the like, (3) second digestion (after ripening) to increase the sensitivity.

The compounds mentioned above may be added to the emulsion at any stage, but the most preferable result is obtained when the compounds are added after second digestion and before coating. The compounds may be added in the emulsion as a solution in a solvent giving no detrimental effect on the emulsion, for example, water, a lower alcohol, such as, methanol or ethanol, a ketone such as acetone.

It is not necessary to add these compounds directly in the emulsion, but they may be added to a layer adjacent to the emulsion layer, such as, protective coating, and allowed to diffuse into the emulsion layer.

The photographic emulsion that can be employed in this invention is that of silver chloride, silver bromide, silver chlorobromide, silver iodobromide, or silver chloroiodobromide. The emulsion of silver chlorobromide is most preferable.

The emulsion may be sensitized chemically by the well-known methods, for example, by the addition of unstable compounds containing sulfur such as ammonium thiosulfate, or allyl thiourea (ref. P. Glafkides: Chimie Photographique, 2eme Edition Photocinéma, 1957 p. 297, Paul Montel Paris), and/or compounds of gold such as complex of mono-valent gold and thiocyanic acid (ref. ibid. p. 301). The emulsion also may be optically sensitized by the addition of sensitizing dyes such as cyanine dyes, or merocyanine dyes (for example, ref. Shinichi Kikuchi et al., "Handbook of Scientific Photograph," 1959, pp. 15–24, Maruzen, Tokyo). The emulsion also may be stabilized by the addition of heterocyclic compound such as benzotriazole or 1-phenyl-5-mercapto tetrazole. The emulsion also may be hardened by the addition of a hardening agent such as formaldehyde or mucochloric acid, and the emulsion may contain a surface active agent such as saponin in order to facilitate coating.

EXAMPLE

Seven samples were prepared by adding the polyalkylene oxide derivatives and the compounds represented by the general Formula I to an orthochromatic emulsion of silver chlorobromide which contained the optimum amounts of a sensitizing dye and a hardening agent, 30 moles of silver bromide, and gelatin in a proportion of 105 g. of gelatin to 1 mole of silver halide.

The added polymers and compounds were shown in the following table together with their addition amounts.

*Compounds and their amounts*

Sample: (g./mole of silver halide)
- a_____ 0 (reference).
- b_____ 0.72 g. of Compound 2.
- c_____ 0.23 g. of addition polymer made from 1 mole of oleyl alcohol and about 30 moles of ethylene-oxide.
- d_____ 0.72 g. of Compound 2 and 0.23 g. of addition polymer made from 1 mole of oleyl alcohol and about 30 moles of ethylene oxide.
- e_____ 0.30 g. of Compound 7.
- f_____ 20 mg. of polyproplyene-glycol bis (polyethylene-glycol) ether, molecular weight of which is about 2,000, and the ratio of propylene group and ethylene group in the polymer is about 30:8.
- g_____ 0.30 g. of compound 7 and 20 mg. of polypropylene - glycol bis (polyethylene - glycol) ether, molecular weight of which was about 2,000, and the ratio of propylene group and ethylene group in the polymer was about 30:8.

These emulsions were coated on film bases, and then sensitometry and evaluation of halftone-dot were carried out about them.

In sensitometry a tungsten lump (2666° K.) was employed as a light source and an optical step wedge was used to vary the exposure. Development was carried out at 20° C. using the developing solution having the following composition:

| | |
|---|---|
| Hot water _____ cc__ | 500 |
| Anhydrous sodium sulfite _____ g__ | 30 |
| Para-form aldehyde _____ g__ | 7.5 |
| Sodium bisulfite _____ g__ | 2.2 |
| Boric acid _____ g__ | 7.5 |
| Hydroquinone _____ g__ | 22.5 |
| Potassium bromide _____ g__ | 1.6 |
| Additional water, Balance | |
| Total _____ liters__ | 1.0 |

The halftone-dot was evaluated as follows. During exposure, a commercial magneta contact screen (150 lines) was placed in close contact to the sample film, which was exposed and developed in the same way as in the case of sensitometry. The halftone-dot formed was observed by a microscope in comparison with standard samples. The dot was evaluated and classified according to the sharpness of dot edge into five classes A, B, C, D and E, of which A is the sharpest.

Results of 1'30", 2'15" or 3' development at 20° C. are summarized in the following table.

| Sample | Relative Sensitivity | | | Contrast* | | | Dot Quality | | |
|---|---|---|---|---|---|---|---|---|---|
| | 1'30" | 2'15" | 3' | 1'30" | 2'15" | 3' | 1'30" | 2'15" | 3' |
| a | 27 | 58 | 100 | 4.0 | 7.7 | 7.4 | D | B | C |
| b | 65 | 78 | 103 | 7.5 | 7.2 | 6.0 | B | C | D |
| c | 12 | 23 | 55 | 2.0 | 3.5 | 6.3 | E | D | B |
| d | 30 | 62 | 95 | 5.8 | 9.0 | 8.1 | B | A | B |
| e | 75 | 95 | 107 | 7.9 | 7.2 | 6.2 | B | C | D |
| f | 12 | 25 | 60 | 1.8 | 3.0 | 5.1 | E | D | B |
| g | 32 | 55 | 85 | 6.0 | 9.5 | 9.1 | B | A | A |

*Average slope between a point of base density plus fog density plus 0.1 and a point of base density plus fog density plus 2.1 in the characteristic curve.

As seen from the table, $d$ and $g$ give sharper dots and higher contrast in a wide range of time of development.

What is claimed is:

1. A photosensitive material comprising a support, a silver halide emulsion layer, and subsidiary layers adjacent the emulsion layer, at least one of said layers containing (A) a compound selected from the group consisting of the compounds represented by the general formula:

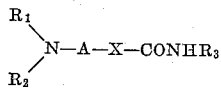

wherein $R_1$ and $R_2$ each is an alkyl group, $R_3$ is a member selected from the class consisting of an alkyl group and aryl group, A is an alkylene group, and X is a member selected from the class consisting of —NH— and —O—; and the hydrohalides and sulfates thereof and (B) the condensation products of alkylene oxide with a compound selected from the group consisting of water, aliphatic alcohols, glycols, fatty acids, aliphatic amines, phenols and hexitol ring dehydration products.

2. The photosensitive material as claimed in claim 1 wherein the amount of said compound (A) is about 0.0 g. to 10 g. per 1 mole of the silver halide in the emulsion.

3. The photosensitive material as claimed in claim 1 wherein $R_1$ and $R_2$ in the compound represented by said formula form a ring.

4. The photographic material as claimed in claim 3 wherein said ring contains a member selected from the class consisting of —O—, —S— and

(where R is a member selected from the class consisting of an alkyl group and an acryl group).

References Cited

UNITED STATES PATENTS 3,190,752  6/1965  Hayakawa et al. _____ 96—107

NORMAN G. TORCHIN, *Primary Examiner.*

J. H. RAUBITSCHEK, *Assistant Examiner.*